June 22, 1926.
A. U. S. DANIELSSON
1,589,515
FUEL FEEDING DEVICE OF INTERNAL COMBUSTION ENGINES
Filed August 20, 1924
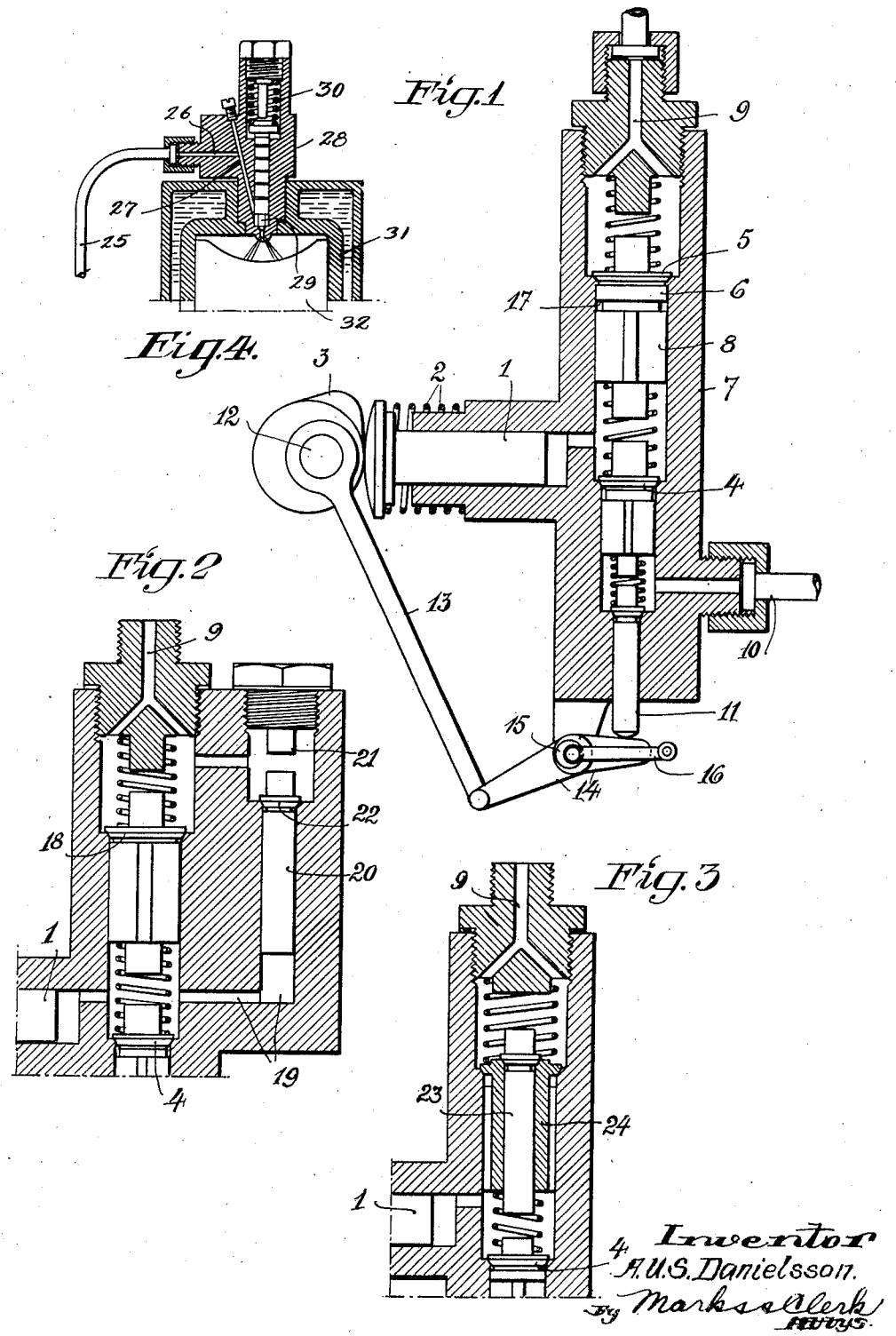

Patented June 22, 1926.

1,589,515

UNITED STATES PATENT OFFICE.

AXEL UNO STURE DANIELSSON, OF STOCKHOLM, SWEDEN, ASSIGNOR TO AKTIEBOLAGET ATLAS-DIESEL, OF STOCKHOLM, SWEDEN.

FUEL-FEEDING DEVICE OF INTERNAL-COMBUSTION ENGINES.

Application filed August 20, 1924, Serial No. 733,234, and in Sweden January 19, 1924.

This invention relates to feed devices for internal combustion engines, which are provided with an injection valve, opened and closed by the increasing and decreasing respectively of the pressure of the liquid fuel contained in the conduit leading to the said valve. Experience has proved that in known feeding devices of the said type the said automatically operating valve is not able to sufficiently rapidly interrupt the supply of fuel to the combustion chamber of the engine but a subsequent dripping of fuel takes place, which results in some disadvantages due to the fact that the combustion of the fuel fed into the combustion chamber at the end of the injection becomes incomplete, owing to too slight velocity of the same, and coke is generated in the fuel sprayer. If, besides, the injection valve is not wholly tight, fuel trickles through the same between the injection operations. Means have been proposed for removing the said disadvantages by a plunger or similar member, the operating chamber of which communicates with the conduit between the delivery valve of the fuel pump and the injection valve and through the returning of which at the end of the working stroke of the fuel pump the volume of said conduit is increased and, consequently, the pressure of the fuel contained in the same is reduced. Hitherto, the said plunger has been positively operated by a cam disk or the like, for which reason the returning of the plunger always takes place at the same position of the crank shaft of the engine and independently of the load of the engine. Owing to this fact the pressure reducing, return stroke of the plunger, at a slight load of the engine, takes place only at a time, after the injection should have ceased, for which reason subsequent dripping of fuel takes place during the shutting period of the injection valve. According to a second proposal the delivery valve, specially constructed for the purpose, of the fuel pump constitutes the said pressure reducing member. In this case, however, the pressure reducing member has been provided in engines having an ignition chamber, consequently in engines having no automatically operating injection valve, the arrangement besides being such, that the return stroke of the member or valve for the reducing of the pressure is dependent of the returning of the piston or plunger of the pump, so that the member or valve cannot start its return stroke, until the said pump plunger has started its suction stroke. Owing to the fact that a certain period is necessary for the reversing of the pump plunger it is easily perceived, that also this arrangement does not afford any guarantee of no subsequent dripping taking place. In order to render the return or working stroke of the pressure reducing member dependent directly of the governor or overflow valve and consequently of the load of the engine and causing the member to operate always just at the moment, at which the quantity of fuel necessary for the working stroke of the engine has been injected into the combustion chamber of the engine by the fuel pump, the said member, according to this invention, is shifted by the pressure of the fuel and, besides, the member is located between a delivery chamber for the fuel, provided with overflow valve, and the automatically operating fuel injection valve. Consequently, as the said overflow valve is opened, which moment may be dependent of the governing device of the engine or has been predetermined manually by means of a suitable adjusting device, the fuel injection is interrupted instantaneously and any subsequent dripping is excluded. The pressure reducing member and the combination of same with the fuel delivery chamber of the engine and the delivery and overflow valves may, evidently, be executed in many ways, as will be perceived from the following detailed description.

Figs. 1 to 3 inclusive of the accompanying drawing show, as examples, three forms of execution of the invention adapted to engines provided with a pump for liquid fuel.

Fig. 4 shows in a vertical section the top end of the working cylinder of the engine, the injection valve and the pipe connecting the said valve to the fuel feeding device.

1, Fig. 1, is the plunger of a fuel pump, the suction stroke of which is effected by a spring 2 and the working stroke of which is effected by a cam disk 3 provided on a shaft, which is rotated by the crank shaft of the engine in any suitable manner. The suction and delivery valves of the pump are designated by 4 and 5 respectively. The top part 6 of the delivery valve 5 is cylindrical and fits tightly to the surrounding wall of the valve casing 7, while the lower part 8 of the said valve is adapted to permit the fuel to pass. 9 is a conduit to which a pipe 25, see also Fig. 4, is connected, said pipe communicating with channels 26, 27, provided in the wall of the casing 28 of the injection valve, which in the present case consists of a needle valve 29, actuated by a spring 30. 31 designates the head of the working cylinder of the engine and 32 designates the working piston shown diagrammatically. 10 is a pipe leading from the fuel store. 11 is a rod slidable in the valve casing 7 and adapted to open at suitable times the suction valve 4, which acts also as a governor or overflow valve. Rod 11 is shifted by an eccentric 12 on the cam disk shaft and by means of the rod 13 and a two-armed lever 14. The said lever 14 is journaled on an eccentrical pin 15, which by means of a lever-arm 16 and a suitable motion transmitting device is adjusted to different positions by the governor (not shown) of the engine, so that the valve 4 is opened at different positions of the crank of the engine according to the load of the engine and the quantity of fuel, which is necessary for the working stroke of the piston of the engine.

Valve 4 is opened as usually by the partial vacuum created by the plunger 1 at its suction stroke.

As the plunger 1 is forced inwards, while the suction valve 4 is closed, the delivery valve 5 must be raised to such a level, that the lower edge 17 of the cylindrical part 6 is located above the valve seat, before the valve permits the fuel delivered by the pump to pass into the conduit 9, 25, 26 and 27 and to the injection valve 29. When the necessary quantity of fuel has been injected into the combustion chamber of the engine and the pressure in the delivery chamber of the pump ceases, by the suction valve 4, shifted by the eccentric 12, or any other overflow valve, communicating with the said delivery chamber and acting as a governor valve, being opened, the valve 5 is returned by the pressure of the fuel contained in the conduit 9, 25, 26 and 27 and shuts off the passage through the valve 5, as soon as the edge 17 arrives to a level below the valve seat. The valve then descends for a further distance, until it bears against the valve seat. During the said operation the volume of the conduit 9, 25, 26 and 27 is increased, which results in the pressure of the fuel contained in the conduit decreasing or even ceasing, depending on the length of the cylindrical part 6, immediately after the quantity of fuel necessary for the working stroke of the engine has been injected into the working cylinder 31.

Consequently, the moment, at which the pressure reducing member or valve 5 returns, is dependent of the bringing of the valve 4 or the overflow valve into open position and, for that reason, is dependent directly of the load of the engine.

In the form of the invention shown in Fig. 2 the delivery valve 18 of the pump is of ordinary construction. In an additional conduit 19 between the delivery chamber of the pump and the conduit 9 communicating with the injection valve, a plunger shaped member 20 is provided adapted to effect the reduction of the pressure mentioned above. The movement of the said member in the one and the other direction effected by the pressure of the fuel is limited by an abutment 21 and a seat provided for the wider top part 22 of the member. During the delivery stroke of the plunger 1 the member 20 is first forced upwards, until it strikes the abutment 21, and then the valve 18 is opened. When the injection of fuel into the combustion chamber of the engine is to be interrupted and the pressure in the delivery chamber of the pump ceases by the suction valve 4, acting also as governor valve, or any other overflow valve communicating with the said chamber being opened, for instance in the manner stated above, the valve 18 is first closed, whereupon the member 20 is forced downwards by the expanding fuel contained in the conduit 9, and the pipe etc. connecting the same with the injection valve which results in an increasing of the volume of the said conduit etc. and a reducing of the pressure, until, it may be, the pressure ceases, dependent on the width of the member 20 or the distance through which the member moves. Consequently, the mode of operating of the combination shown in Fig. 2 is wholly analogous to that of the combination shown in Fig. 1.

In the form of execution shown in Fig. 3 the pressure reducing member 23 is slidable in a channel provided in the delivery valve 24 of the fuel pump and its movement in the one and the other direction is limited by abutments. The mode of operating of the combination shown in Fig. 3 is absolutely the same as that of the form shown in Fig. 2 and for that reason it is not described.

The invention may evidently be modified in many other respects, without exceeding the limits of the invention.

I claim:

1. Feeding device for liquid fuel in internal combustion engines, including in combination a fuel injection device, a delivery chamber for supplied fuel, a valve device provided between the delivery chamber and the injection device, an overflow valve for fuel superfluous for the working stroke of the engine piston and leading from the said chamber, and a member located between the delivery chamber and the conduit leading from the valve device to the injection device, adapted to be shifted automatically by the pressure of the fuel and so constructed, that the same at the reduction of the pressure in the delivery chamber resulting from the opening of the overflow valve, is forced backwards and increases the volume of the said conduit and thus reduces the pressure of the fuel contained in the conduit.

2. A feeding device as claimed in claim 1, wherein the pressure reducing member consists of a plunger located in the delivery valve of the fuel pump of the engine, and abutments for limiting the movement of the plunger in opposite directions.

In testimony whereof, I have signed my name to this specification.

AXEL UNO STURE DANIELSSON.